United States Patent
Daily

(10) Patent No.: US 8,295,178 B2
(45) Date of Patent: Oct. 23, 2012

(54) MANUAL CONFIGURATION FOR SITES THAT CANNOT GIVE READ/WRITE CREDENTIALS TO A VOICE OVER INTERNET PROTOCOL (VOIP) MONITOR

(75) Inventor: Stephen Richard Daily, Broken Arrow, OK (US)

(73) Assignee: Solarwinds Worldwide LLC, Austin, TX (US)

( * ) Notice: Subject to any disclaimer, the term of this patent is extended or adjusted under 35 U.S.C. 154(b) by 559 days.

(21) Appl. No.: 12/153,450

(22) Filed: May 19, 2008

(65) Prior Publication Data
US 2009/0285102 A1  Nov. 19, 2009

(51) Int. Cl.
*H04J 3/16* (2006.01)
(52) U.S. Cl. ........ 370/235; 370/241; 370/252; 370/245; 370/259; 370/486
(58) Field of Classification Search .................. 370/235, 370/241, 252, 242, 245, 216, 254, 259, 400, 370/486, 493
See application file for complete search history.

(56) References Cited

U.S. PATENT DOCUMENTS

| | | | |
|---|---|---|---|
| 5,915,119 A * | 6/1999 | Cone | 713/310 |
| 6,584,430 B1 * | 6/2003 | Rosenbaum et al. | 702/183 |
| 7,606,159 B2 * | 10/2009 | Dalal et al. | 370/237 |
| 2007/0058546 A1 * | 3/2007 | Na | 370/230 |
| 2008/0178025 A1 * | 7/2008 | Hand et al. | 713/323 |
| 2009/0248765 A1 * | 10/2009 | Akidau et al. | 707/205 |

* cited by examiner

*Primary Examiner* — Michael Thier
*Assistant Examiner* — Jamal Javaid
(74) *Attorney, Agent, or Firm* — Squire Sanders (US) LLP

(57) ABSTRACT

Read-only VoIP node configuration includes monitoring the VoIP network to determine the performance of the various nodes, and data from nodes is collected and stored. Where the nodes are not currently operating or cannot be monitored, no data is assigned in the non-operating nodes. The monitoring results are presented to a user, and misconfigured or faulty nodes are identified based upon predefined criteria. Information is then provided to a user to guide the user through the process of configuring the identified faulty/misconfigured node. The configuration commands for an appropriate network device may be presented to user so that user (with write authority) may implement and carry out the configurations commands.

21 Claims, 6 Drawing Sheets

FIGURE 1B

VOIP Node Monitoring Configuration Data 131

| |
|---|
| Source Node Identifier 132 |
| Destination Node Identifier (LAN) 133 |
| IP SLA Operation Number 134 |
| Read Only credential for source device 135 |

Read Only VOIP Node Configuration Method
200

Guide User through initial device configuration
210

↓

Monitor Node Configuration and Performance
220

↓

Store Performance Data
230

↓

Present Results to User
240

↓

Guide User through configuration of Read-only nodes
250

MANUAL CONFIGURATION FOR SITES THAT CANNOT GIVE READ/WRITE CREDENTIALS TO A VOICE OVER INTERNET PROTOCOL (VOIP) MONITOR

FIELD OF THE INVENTION

The present invention relates to a software tool and related method for assisting a user to manually configure their network and software to allow the software to monitor the network and identifying a misconfigured node in a Voice over Internet Protocol (VOIP) network, and assisting a user to correctly reconfigure the misconfigured node, even when the software tool does not have read/write credentials for the node.

BACKGROUND OF THE INVENTION

In voice over internet protocol (VOIP), telephone communications are sampled, digitized, and transmitted over a data packet transmission network over nodes in a distributed network to provide telephone communications between the nodes using digital data exchange. VOIP is becoming increasingly popular due to improvements in performance and excess data transmission bandwidth that allows VOIP communications at relatively low costs. A complete description of VOIP communications are beyond the scope of the present application, but more information regarding VOIP communications can be found, for example, in either ITU H.323, version 6 or IETF Session Initiation Protocol, the subject matters of which are hereby incorporated by reference in full.

In order to provide acceptable VOIP communications, the connections between the various nodes in the distributed networks must be configured. For example, the VOIP communications require sufficiently high QoS to allow data transmission without significant delay or data loss to avoid audio delay or audio loss. Typically, the communications between the VOIP network nodes are defined by service level agreements that define the default communication protocols between the nodes as needed, for example, to maintain the desired QoS levels. The need for high QoS communications needs to be balanced against the network overhead of providing the high QoS communications. Therefore, the service agreements ideally define a high QoS between nodes connection used primarily for VOIP data transfers but a low QoS between nodes connection used primarily for other, non VOIP data transfers.

Thus, these connections between the various nodes are each manually configured. Even a small VOIP network may include several local area networks (LANs), each having numerous interconnected nodes. Consequently, configuring the numerous nodes can be a laborious process.

The ability to pinpoint faults is important in VOIP, and daily support and troubleshooting are typically two of the most difficult parts about running a VOIP system. For example, it is difficult to anticipate the impact of losing that particular router or switch, with the VOIP traffic being rerouted in response to this change. Conventional VOIP monitoring tools monitor a network to pinpoint where problems come from and can model what will happen if the network topology changes. Most of the tools monitor jitter, packet loss, throughput, volume issues, delay, and other quality of service issues from within the network and/or call center applications. Nevertheless, the monitoring of the VOIP transactions over a network remains a tedious process that entails significant costs and computational overhead.

Conventional solutions measure VOIP quality in a "reactive" fashion by tracking end user phone calls from a span port on a switch. However, a local switch port is a poor location to gather network-wide VOIP quality metrics because VOIP quality and performance are determined through the performance of the connection from end-to-end, and monitoring the performance at the end node does not provide adequate information on the performance of the network. Also, monitoring actual call data raises privacy concerns due to the monitoring of actual calls.

Internet Protocol Service Level Agreements (IP SLAs™) enabled by Cisco IOS® software enable VOIP system monitoring by creating and monitoring synthetic voice data traffic. Likewise, other competing products provide similar functionalities. In particular, the various VOIP network components, such as routers and nodes may create synthetic traffic and the transmission of this synthetic traffic may be followed to gauge system performance.

In the CISCO IOS® software that resides on various network routers and nodes, IP SLA is an included feature that allows administrators to analyze IP service levels for IP applications and services, including VOIP. For more information on IP SLA, please refer to the IP SLA user manual at http://www.cisco.com/_application/_pdf/_en/_us/_guest/_products/_ps6350/_c2001/_ccmigration_09186a0080789b77.pdf. IP SLAs use active traffic-monitoring technology to monitor continuous traffic on the network to measure overhead network performance. Routers further provide IP SLA responders that give accuracy of measured data across a network by receiving the synthetic data and sending a predefined response back to the initiator which calculates the time spent in each leg of the round trip, measures packet loss and jitter to provide performance network statistics.

In particular, IP SLAs are often used to generate data which is needed by the service level agreements to define the characteristics of a connection between two network components, such as two nodes. With IP SLAs or similar synthetic voice data distribution tools, routers and/or switches may perform periodic measurements to monitor the status of the VOIP network and to collect network performance statistics without intruding on actual voice calls. These statistics include MOS, jitter, network latency, packet loss and other important QoS metrics that provide detailed visibility into VOIP performance.

The use of synthetic traffic in the IP SLAs throughout the system avoids the above-described privacy concerns while still providing reasonably accurate system performance measurements. Nevertheless, the use of synthetic traffic also has shortcomings. The data produced by the measurements of the systematic traffic may be voluminous and difficult to process. Also, the creation and transmission causes significant system overhead due to bandwidth usage during the transmission of the synthetic traffic. Also, the processing of the synthetic traffic to produce the performance measurements burdens the processors in the routers and other associated network components.

Furthermore, programming of the VOIP nodes for IP SLA monitoring can be tedious. As described above, even a small VOIP network may have numerous nodes. Also, a user is faced with the decision of using long term or permanent IP SLA that may consume excess network resources and produce large volumes of data, or using short term IP SLA that may expire during a desired monitoring period. IP SLA operations much be configured for a network device requiring read and write credentials to save the configured operations into the network device.

SUMMARY OF THE INVENTION

In response to these and other needs, embodiment of the present application relate a read-only VOIP node configuration method. The method generally includes monitoring the VOIP network to determine the performance of the network paths between various nodes of interest, and data from these network paths are collected and stored. Where the nodes are not currently operating, data is not collected or stored. Network paths without current IP SLA data are marked as non-responding.

The monitoring results are presented to a user, and misconfigured or operation result. For example, VOIP performance criteria related to bandwidth, lag, jitter, etc. may be defined, and the collected data from the IP SLA tests may be used to test each of the nodes. Likewise, nodes that do not respond to requests to their IP SLA operations may be assumed to be malfunctions or misconfigured.

Information is provided to a user to guide the user through the process of configuring the IP SLA operations on their network devices and makes recommendations for appropriate IP SLA operation numbers and IP SLA configuration attributes such as the codec, test pack size, and interval. Additionally, misconfigured IP SLA operations are identified and presented to the user along with a configuration management screen so that the user can change the configuration recorded in the database to match the network or change the IP SLA operation on the network to match what is recorded in the database. For example, as described above, various configuration commands may be stored in a command database. The configuration commands for an appropriate network device may be presented to user so that user (with write authority) may implement and carry out the configurations commands.

BRIEF DESCRIPTION OF THE DRAWINGS

For proper understanding of the invention, reference should be made to the accompanying drawings, wherein:

FIG. 1B depicts a node configuration data record in accordance with embodiments of the present application;

DETAILED DESCRIPTION OF THE PREFERRED EMBODIMENTS

Figure 1A:
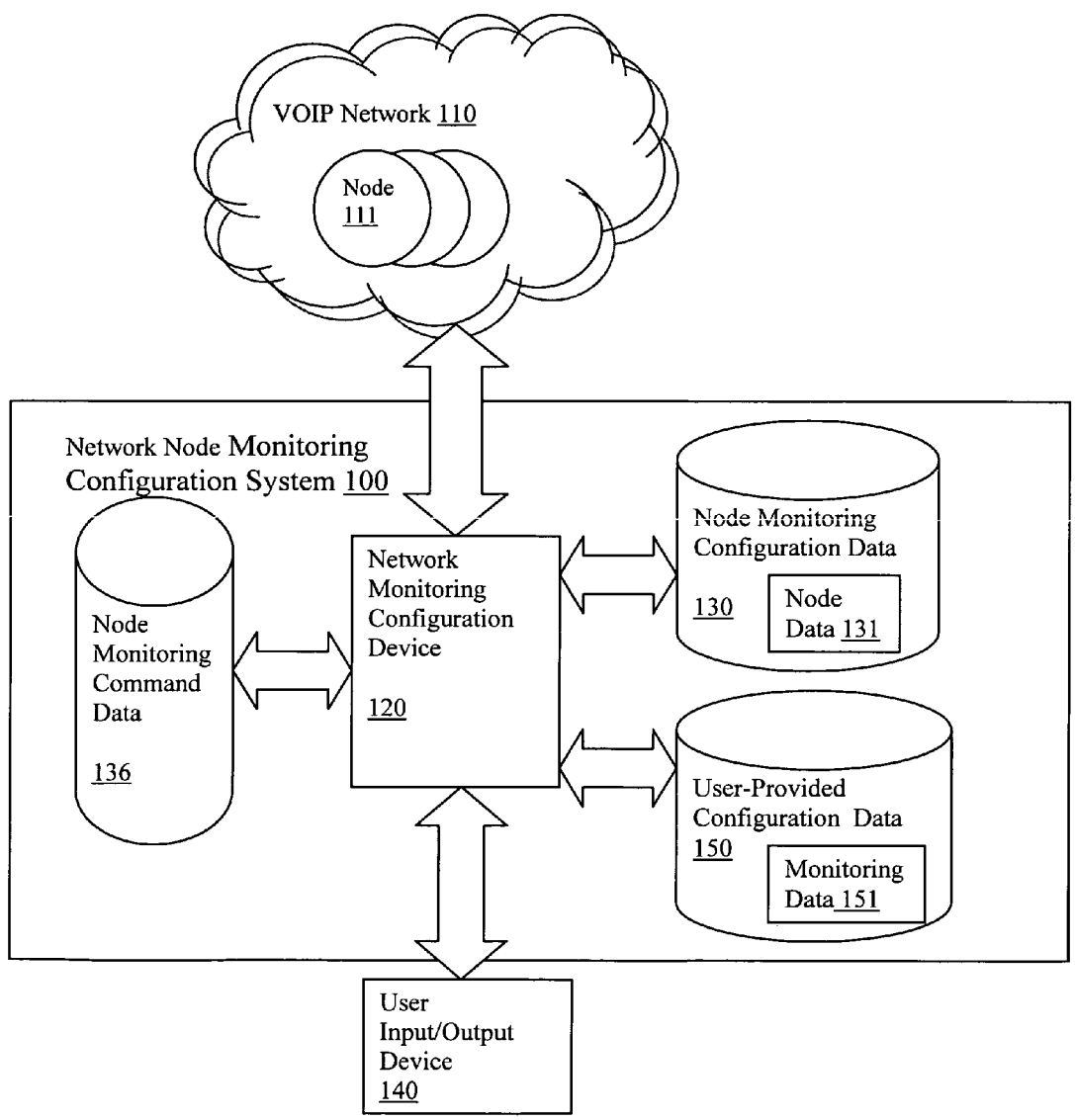
FIG. 1A depicts a block diagram of elements of a VOIP monitoring configuration system in accordance with an embodiment of the present application.

Referring now to FIG. 1A, a voice over IP (VOIP) configuration system 100 in accordance with an embodiment of the present invention is present. In particular, the VOIP monitoring system 100 includes a VOIP network 110 that includes multiple nodes 111. A VOIP control module 120 to monitoring and configuration the VOIP network 110 is connected to the network 110 as needed to exchange data with the nodes 111. The VOIP control module 120 generally enables the user to access and control the configurations for the connections between the various nodes 111 in the network 110, as described in greater detail. The particular function of the VOIP control module 120 will be described in greater detail below.

The VOIP monitoring configuration system 100 may further include a node monitoring configuration database 130 that includes data 131 regarding the status of the various nodes 111 and the status of the connection between the nodes. For example, as described in FIG. 1B, the node monitoring configuration data 131 for a particular node 111 may include a source node identifier 132 and information regarding a network or geographic location of that node 133. The node monitoring configuration data also indicates the target node of a network path. The node monitoring configuration data 131 may further include data regarding the service levels agreements (SLAs) 134 between that node and other nodes. As well-known in the field of networks, the SLA defines default communication change configuration values between that node and other connected nodes. Thus, the SLA data 134 may include, for example, the nodes involved in the SLA, the connection configurations defined in the SLA, and the duration of the SLA. The read only credentials are also stored so the IP SLA data can be read form the source network node.

Similarly, node monitoring configuration data 131 may further include data regarding the IP service levels agreements (IP SLAs) 135 between that node and other connected nodes. The IP SLAs 135 or other VOIP monitoring configuration data described the transfer of synthetic, or false, data between two or more nodes and directs the nodes to monitor the transfer of this synthetic as needed to calculate performance measures for that transfer. Thus, the IP SLA data 134 may similarly include, for example, the nodes involved in the IP SLA, details regarding the synthetic data to be transferred and the measurements to be calculated, and the duration of the IP SLA.

Although the node configuration data 131 is depicted as residing on the VOIP monitoring configuration database 130, it should be appreciated that the node configuration data 131 may actually reside on the respective nodes 111 in the VOIP network 110, and the VOIP monitoring configuration database 130 may contain copies of this data or otherwise contain information on the location of the VOIP node monitoring configuration data.

Returning back to FIG. 1A, a user interface 140 provides a system administrator or other user access to the VOIP monitoring configuration tool 120. The user interface 140 may be, for example, an application resident on a local computer that administers and controls access to the VOIP monitoring configuration tool 120. Similarly, the user interface 110 may be a program served from the VOIP monitoring configuration tool 120 or an associated data server and executed on a browser application resident on the system administrator's computer. As described in greater detail below, the user interface 140 receives and displays one or more aspects of the VOIP node data 131. The user interface 140 further accepts inputs from the user and allows the user to specify various configuration settings for the VOIP node monitoring. Optionally, the user-specified VOIP node monitoring selections 151 may be stored in a VOIP node monitoring selections data table 150. For example, the user may specify the nodes and connections to be monitored using the synthetic traffic and the duration for this monitoring. The user could likewise specify other aspects of the IP SLA monitoring, such as the type of synthetic data to be transmitted and other selectable aspects of the monitoring such as the specified connection transmission parameters.

Optionally, in one implementation, the VOIP monitoring configuration device 120 further has access to a command repository 136 that contains various monitoring and configurations commands. For example, the command repository 136 may contain instructions to implement the IP SLAs for the various nodes 111. For example, the command repository 136 may contain different specific commands as needed to implement the IP SLAs for each of the nodes 111, and these commands may be selected and implemented as needed to achieve the desired IP SLAs. Alternatively, as known in the art of node configuration, the monitoring command repository 136 may include generic IP SLA configuration commands that are finalized and carried out using the specific node and connection data contained in the node database 130. It should be appreciated that node connection tools are well known and may be leveraged as needed.

In preferred operation, the user interface 140 presents general status data regarding the status of monitoring of the various nodes 111 in the monitored VOIP network 110. For example, the user interface 140 may list one or more of the nodes 111 and describe the configuration of the monitoring of the connections from that node 111. Alternatively, the nodes 111 and the connections between which may be graphically depicted according to known techniques. After viewing the monitoring status of the nodes 111 and the connections, the user may provide commands to modify the monitoring configuration of the nodes 111. In particular, in the embodiments of the present application, the user may select general VOIP network monitoring configurations that are then implemented through changes in IP SLAs to achieve the desired configurations with minimal manual programming required by the user.

Optionally, the user interface 140 may present this data to the user to display the functional status of the nodes, such as the measured performance statistics. The user interface 140 may further flag nodes that are operating outside of pre-set performance goals, as suggested by the measured performance statistics formed using the synthetic data transmissions.

Referring back to FIG. 1A, where certain or all nodes 111 in the VOIP network are read-only, such that the Network Node Monitoring Configuration System 100 can only access data stored in the restricted nodes 111, the Network Node Monitoring Configuration System 100 cannot write to the read-only nodes 111 to change their configurations as needed for optimal operation of the VOIP network 110.

Figure 2:
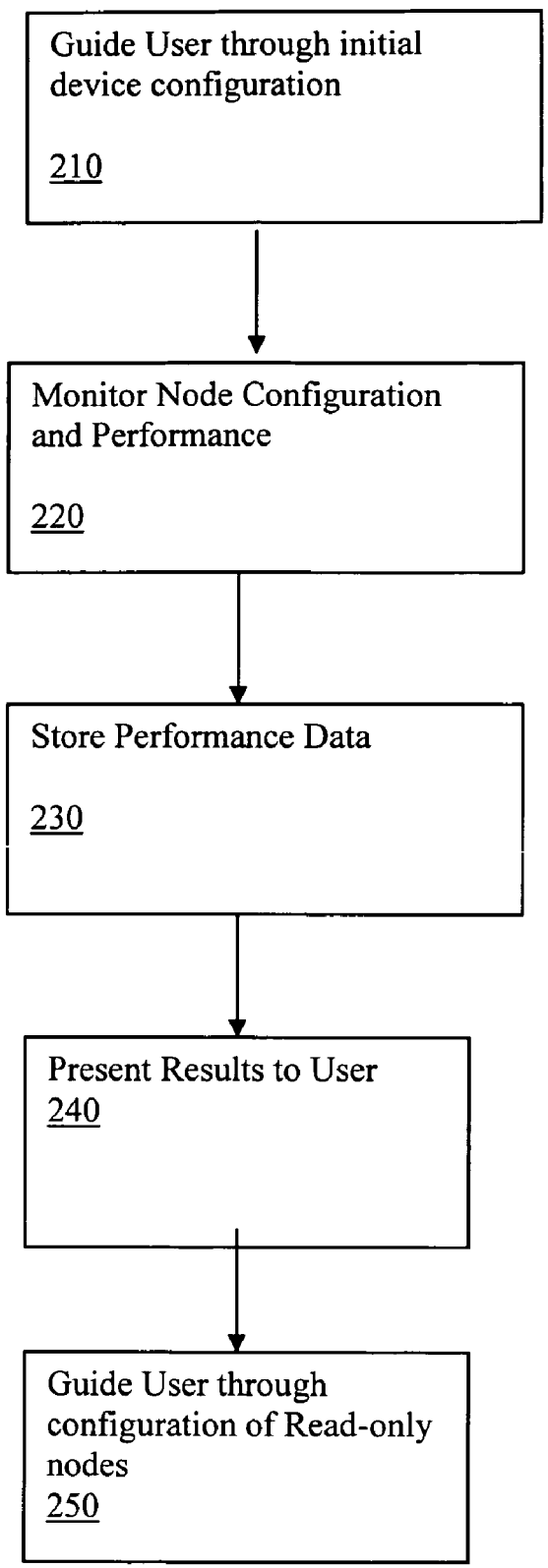
FIG. 2 depicts a flow chart of a read-only VOIP configuration method according to an embodiment of the present application.
Figure 3:
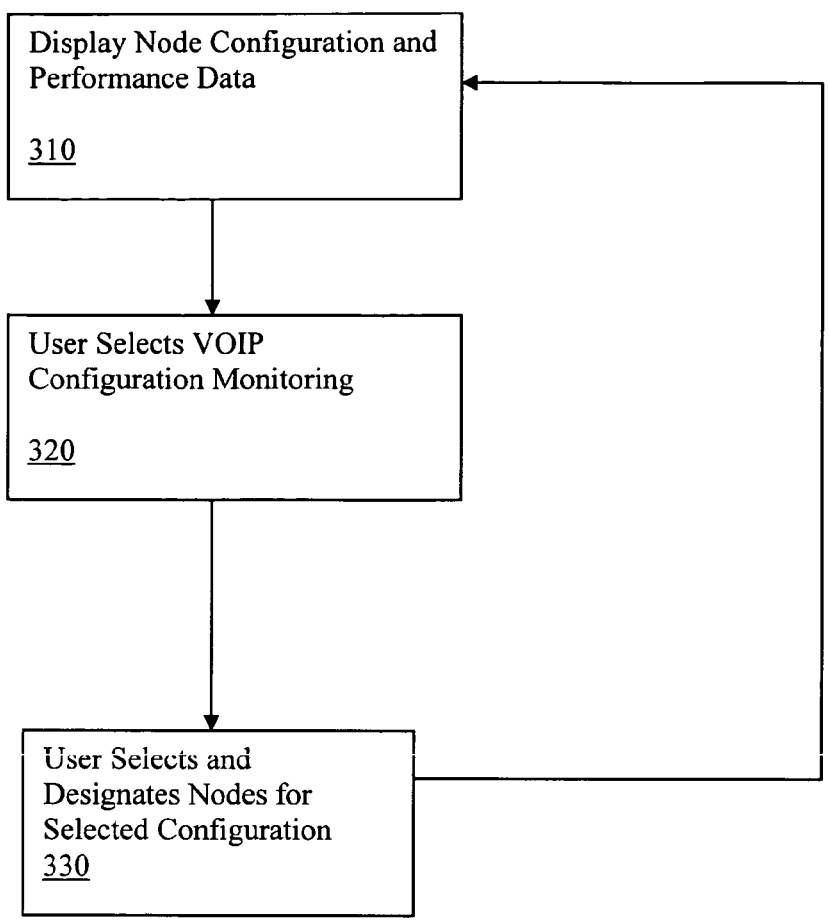
FIG. 3 illustrates a flow chart of a VOIP monitoring method according to an embodiment of the present application.

Referring now to FIG. 2, a read-only VOIP node configuration method 200 in accordance with embodiments of the present application is presented. The method begins in step 210 by guiding a user through an initial configuration of the device, generally using conventional applications and methodologies. The method generally further includes monitoring the VOIP network 110 to determine the performance of the various nodes in step 220, and data from nodes is collected and stored in step 230, as described above. Where the nodes are not currently operating, the status of the source node in the database is changed to 'misconfigured' and no data is stored.

In step 240, the monitoring results are presented to a user, and misconfigured or faulty nodes are identified, based upon their response to a request to their IP SLA operations. For example, VOIP performance criteria related to bandwidth, lag, jitter, etc. may be defined, and the collected data from the IP SLA tests may be used to test each of the nodes. Likewise, nodes associated with non-response to IP SLA operation requests.

In step 250, information is provided to a user to guide the user through the process of configuring the identified faulty/misconfigured node. For example, as described above, various configuration commands may be stored in the command database 136. The configuration commands for an appropriate network device 111 may be presented to user so that user (with write authority) may implement and carry out the configurations commands.

Referring to command selection method 300, configuration commands may be selected based upon the current stored configuration data related to the type, brand, function, etc of a network node 111, in step 310. Typically, the identified commands are generic command sentences that need to be properly completed for execution. For proper command configuration, the data acquired from nodes in step 210 may be used. For example, where there is no performance data, the node may be configured to perform IP SLA transaction as described above to test the node may reconfigured as needed to address the performance concerns, step 330. For example, for a node suffering from slow data transfer rates due to congestion, adjacent nodes could be configured to assist in transferring the VOIP traffic or to reroute transmission of non-VOIP data traffic.

For example, the monitoring system may use the read only credentials to collect the IP SLA operations from the devices and attempts to find matches between the operations configured on the network devices and the monitoring system's internal representation of the network paths it is monitoring. This occurs by matching source device information, destination device information, and codec. The monitoring system then presents the found IP SLA operation numbers to the user for verification. The user can then store the updated information into its data store or the user can change that information and the monitoring system then guides the user through the process of manually changing IP SLA operations on the devices. The process 300 may be then be repeated to continuously identify misconfigured/faulty nodes.

Figure 4:
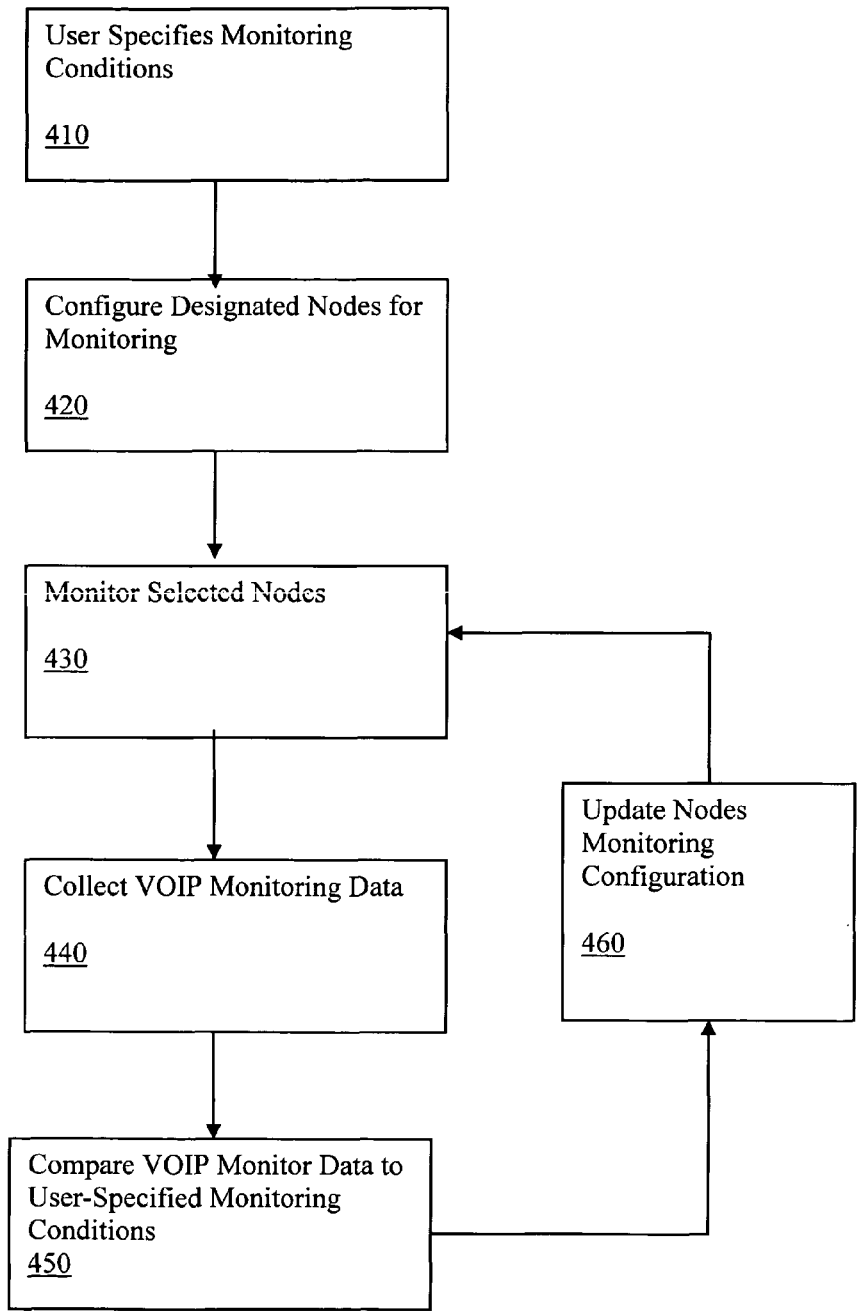
FIG. 4 illustrates a VOIP dynamic node monitoring configuration method according to another embodiment of the present application.

Referring now to FIG. 4, another embodiment of the present invention relates to a method 400 for dynamically monitoring and configuring the nodes for monitoring after receiving user preferences. As described above, initial user monitoring preferences may be received in step 410 and the nodes may be initially the nodes are appropriately configured, for example, by specifying the desired IP SLA operations, the nodes are monitored in using the transmission of synthetic data in step 430, and the VOIP system data is collected in step 440.

Continuing with method 400, the collected VOIP monitoring data from step 440 is compared to the initial user specified monitoring conditions in step 450. For example, the performance of the specified nodes can be evaluated to insure that the desired monitoring is occurring. If no performance statistics are returned or if the performance statistics are otherwise do not correctly reflect the user's monitoring instructions from step 410, those monitoring problem nodes can be identified. For example, if an IP SLA for a node expires, that node will not return desired monitoring results. The node configurations can be updated to reflect the desired monitoring changes in step 460 to address any problems in the monitoring.

Referring now back to FIG. 1, the implementation of the method 400 is now quickly summarized. In particular, the user interface 140 can accept and forward user monitoring preferences to a VOIP monitoring configuration tool 120. The VOIP monitoring configuration tool 120 stores the user-specified VOIP node monitoring selections 151 in the VOIP node monitoring selections data table 150, and these selections may be used to configure the IP SLAs or other node monitoring techniques, and these changes are stored in the node monitoring configuration data table 130.

After monitoring occurs and results, i.e., IP SLA statistics, are returned from the monitored nodes, theses results can be compared with the user provided configuration data 150 by the VOIP monitoring configuration tool 120 to identify any nodes that are not being properly monitored, as directed in the stored user monitoring preferences. Alternatively, the VOIP monitoring configuration tool 120 can periodically or dynamically update the node monitoring configuration data table 130 with IP SLA status data collected from the nodes 111, and the node monitoring configuration data 131 can be compared to the VOIP node monitoring selections 151 in the VOIP node monitoring selections data table 150 to identify nodes that are not conforming to the user's VOIP monitoring selections 151.

After these nodes are identified, the VOIP monitoring configuration tool 120 can update the node monitoring configuration data 131 as needed to accomplish the user's VOIP monitoring selections 151. For example, as described above, the VOIP monitoring configuration tool 120 can access a node monitoring command database 136 to acquire and form appropriate commands as needed to form the desired IP SLAs for the desired nodes.

Figure 5:
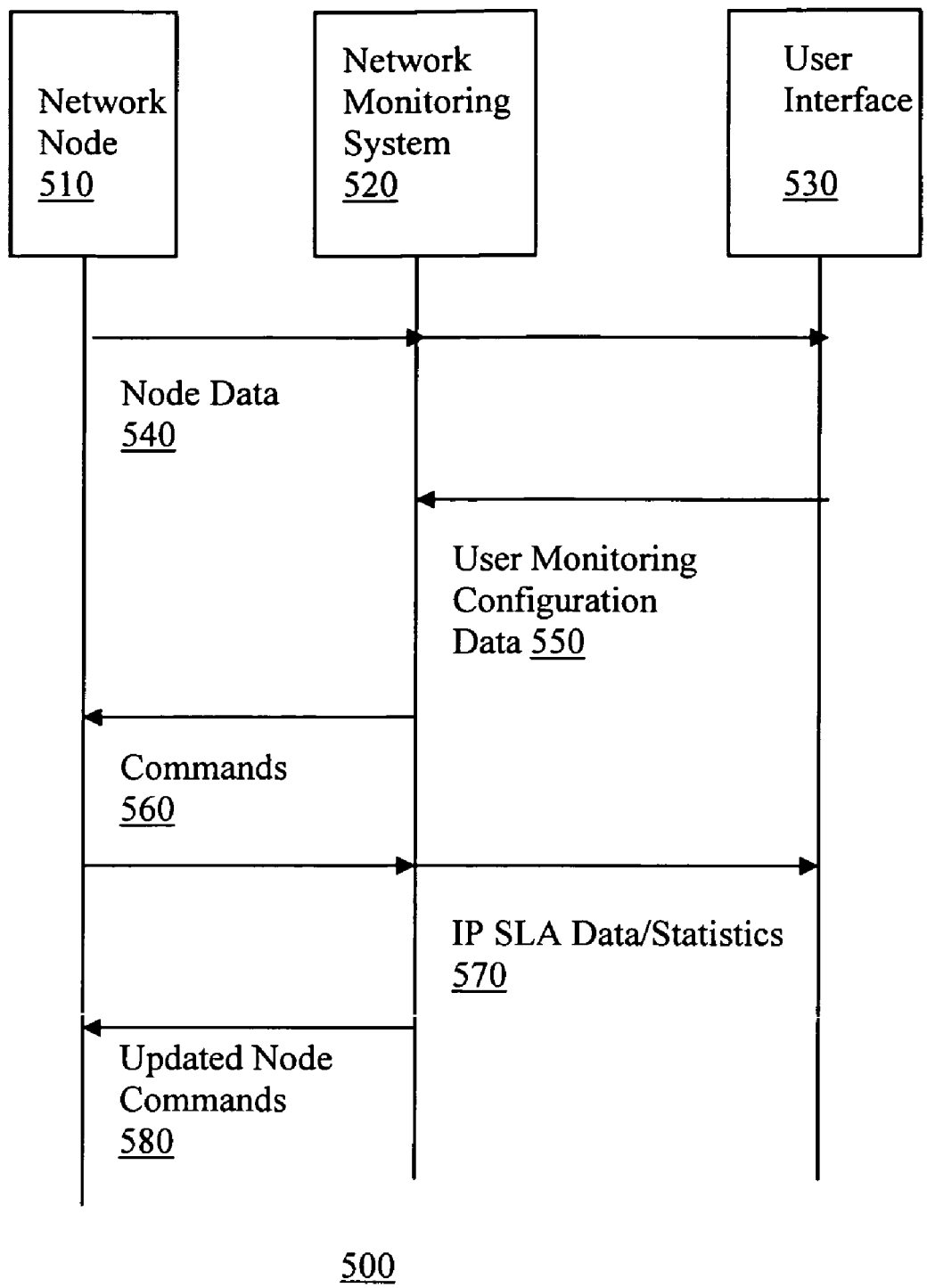
FIG. 5 depicts a process flow of the VOIP dynamic node monitoring configuration method of FIG. 4 according to an embodiment of the present application.

Referring now to FIG. 5, a process flow 500 for node command configuration is provided. In particular, the process flow 500 includes the interaction of three components, namely a network node 510, a networking 540 describing the nodes and the configuration of the node monitoring is collected from the node 510 by the networking monitoring configuration system 520 and forwarded to a user interface 530. In response this node configuration data 540 that describes the node 510 and its monitoring status, the user interface 530 forwards user monitoring configuration data 550 to the networking monitoring configuration system 520. the networking monitoring configuration system 520 uses the received user monitoring configuration data 550 and the node configuration data 540 to form appropriate commands 560, as needed to affect the desired configuring and/or monitoring of the user configured call paths.

Continuing with the process flow 500 in FIG. 5, the networking monitoring configuration system 520 receives the IP SLA data and/or statistics 570 and forwards these data/monitoring statistics to the user interface 530. The networking monitoring configuration system 520 also reviews the received user monitoring configuration data 550 to determine if the monitoring is conforming to the received user monitoring configuration data 550. For example, if one of the IP SLAs has expired within a time period for desired monitoring, the returned configuration data may reflect this expiration. Alternatively, the monitoring data will be incomplete for the desired IP SLA. In response, the networking monitoring configuration system 520 forwards updated IP SLA commands 580 to re-initiate the expired IP SLA as needed to complete the desired VOIP node monitoring as specified in the received user monitoring configuration data 550.

As discussed above, various embodiments of the invention can be configured in numerous physical elements, or can be configured at a single network element or configured in a number of elements having various disclosed functions distributed throughout. The control of the IP SLA or other monitoring configurations and other functions can be performed at various network components, such as at a user equipment, at VOIP server, at an access gateway or at another network component associated with the VOIP network and access to the network.

A person of ordinary skill in the art would understand that the above-discussed embodiments of the invention are for illustrative purposes only, and that the invention can be embodied in numerous configurations as discussed above. Additionally, the invention can be implemented as a computer program on a computer readable medium, where the computer program controls a computer or a processor to perform the various functions which are discussed as method steps and also discussed as hardware or hardware/software elements.

What is claimed:

1. A configuration method for read-only voice over internet protocol (VOIP) nodes, comprising:
    monitoring a VOIP network to determine performance of the nodes;
    collecting and storing performance data from the nodes, wherein the performance data is collected from internet protocol (IP) service level agreement (SLA) tests comprising transferring synthetic data between the nodes and calculating performance measures for the transfer of the synthetic data;
    presenting monitoring results based on the calculated performance measures to a user, wherein the monitoring results comprises an identification of misconfigured or faulty nodes based upon predefined criteria; and
    providing information to a user and guiding the user through a process of configuring the identified misconfigured or faulty nodes using the provided information, wherein the providing of the information to the user comprises providing recommendations for appropriate IP SLA operation numbers and IP SLA configuration attributes,
    wherein the performance data comprises the nodes involved in the IP SLA tests, details regarding the synthetic data to be transferred and measurements to be calculated, and a duration of the IP SLA tests,
    wherein the SLA comprises default communication change configuration values between the nodes,
    wherein the synthetic data comprises false data.

2. The method of claim 1, wherein, when a node is not currently operating, no data is assigned in the node that is not currently operating.

3. The method of claim 2, further comprising creating a blank entry associated with the node in a VOIP data table.

4. The method of claim 3, wherein the blank data is associated with a node that cannot be monitored.

5. The method of claim 3, wherein nodes associated with blank data entries are assumed to be malfunctions or misconfigured.

6. The method of claim 1, wherein the VOIP performance criteria relate to at least one of bandwidth, lag, jitter, and delay.

7. The method of claim 1, wherein a plurality of configuration commands is stored in a command database, wherein a configuration command for the node is selected and presented to a user.

8. A non-transitory computer-readable medium comprising a computer program for configuring read-only voice over internet protocol (VOIP) nodes, said computer program, when executed by a processor, performs:
    monitoring a VOIP network to determine performance of the nodes;
    collecting and storing performance data from the nodes, wherein the performance data is collected from internet protocol (IP) service level agreement (SLA) tests comprising transferring synthetic data between the nodes and calculating performance measures for the transfer of the synthetic data;

presenting monitoring results based on the calculated performance measures to a user, wherein the monitoring results comprises an identification of misconfigured or faulty nodes based upon predefined criteria; and providing information to a user and guiding the user through a process of configuring the identified misconfigured or faulty nodes using the provided information, wherein the providing of the information to the user comprises providing recommendations for appropriate IP SLA operation numbers and IP SLA configuration attributes, wherein the performance data comprises the nodes involved in the IP SLA tests, details regarding the synthetic data to be transferred and measurements to be calculated, and a duration of the IP SLA tests, wherein the SLA comprises default communication change configuration values between the nodes, wherein the synthetic data comprises false data.

9. The non-transitory computer readable medium of claim 8, wherein, when a node is not currently operating, no data is assigned in the node that is not currently operating.

10. The non-transitory computer readable medium of claim 9, further comprising creating a blank entry associated with the node in a VOIP data table.

11. The non-transitory computer readable medium of claim 10, wherein the blank data is associated with a node that cannot be monitored.

12. The non-transitory computer readable medium of claim 10, wherein nodes associated with blank data entries are assumed to be malfunctions or misconfigured.

13. The non-transitory computer readable medium of claim 8, wherein the VOIP performance criteria relate to at least one of bandwidth, lag, jitter, and delay.

14. The non-transitory computer readable medium of claim 8, wherein a plurality of configuration commands is stored in a command database, wherein a configuration command for the node is selected and presented to a user.

15. A configuration apparatus for read-only voice over internet protocol (VOIP) nodes, the apparatus comprising:

a server configured to monitor a VOIP network to determine performance of the nodes;

collect and storing performance data from the nodes, wherein the performance data is collected from internet protocol (IP) service level agreement (SLA) tests comprising transferring synthetic data between the nodes and calculating performance measures for the transfer of the synthetic data;

present monitoring results based on the calculated performance measures to a user, wherein the monitoring results comprises an identification of misconfigured or faulty nodes based upon predefined criteria; and provide information to a user and guide the user through a process of configuring the identified misconfigured or faulty nodes using the provided information, wherein the providing of the information to the user comprises providing recommendations for appropriate IP SLA operation numbers and IP SLA configuration attributes, wherein the performance data comprises the nodes involved in the IP SLA tests, details regarding the synthetic data to be transferred and measurements to be calculated, and a duration of the IP SLA tests, wherein the SLA comprises default communication change configuration values between the nodes, wherein the synthetic data comprises false data.

16. The apparatus of claim 15, wherein, when a node is not currently operating, the server is configured to assign no data in the node that is not currently operating.

17. The apparatus of claim 16, wherein the server is configured to create a blank entry associated with the node in a VOIP data table.

18. The apparatus of claim 17, wherein the blank data is associated with a node that cannot be monitored.

19. The apparatus of claim 17, wherein the server is configured to assume that the nodes associated with blank data entries are malfunctions or misconfigured.

20. The apparatus of claim 15, wherein the VOIP performance criteria relate to at least one of bandwidth, lag, jitter, and delay.

21. The apparatus of claim 15, wherein the server is configured to store a plurality of configuration commands in a command database and to select and present a configuration command for the node to a user.

* * * * *